United States Patent Office 2,898,695
Patented Aug. 11, 1959

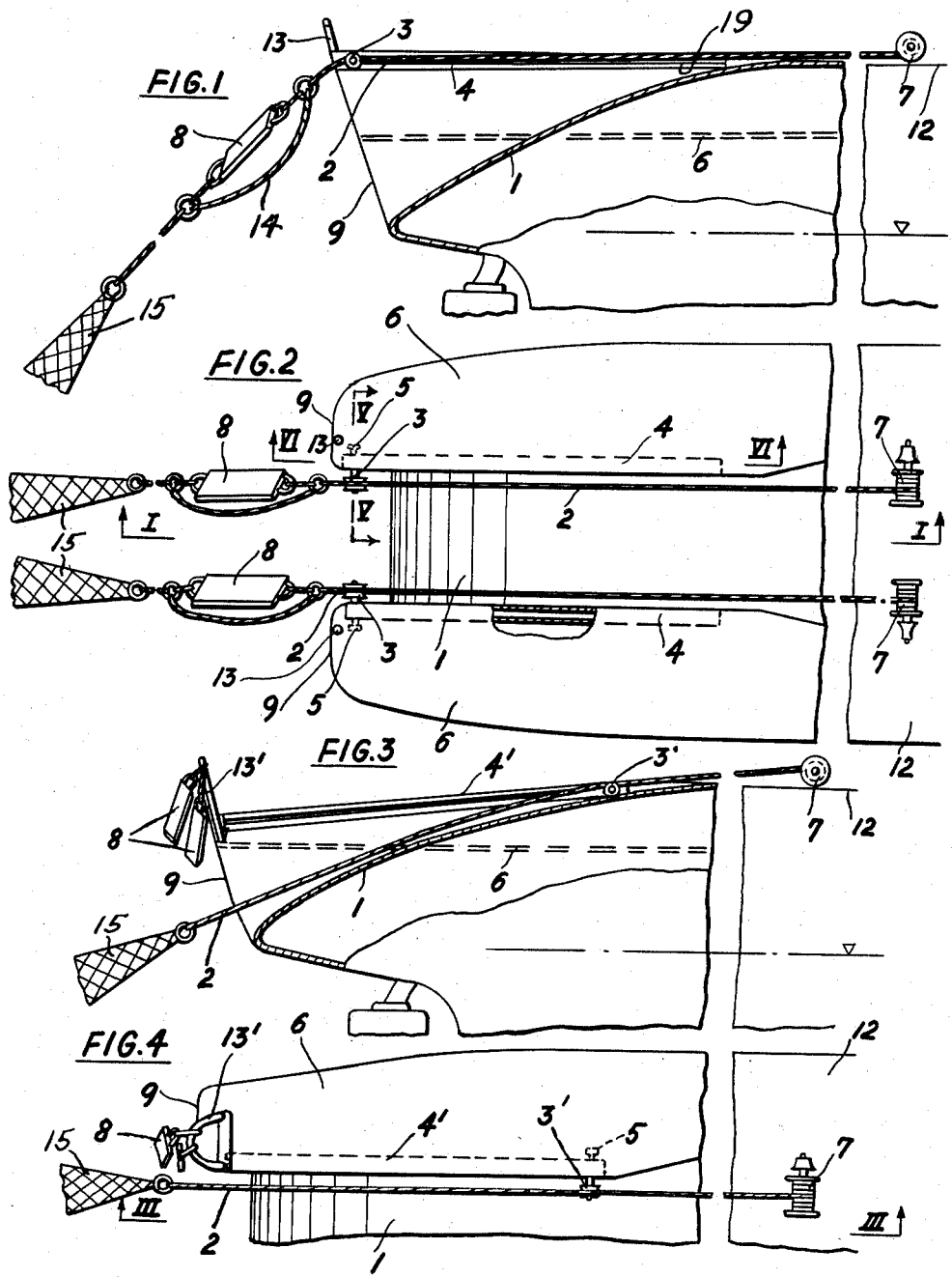

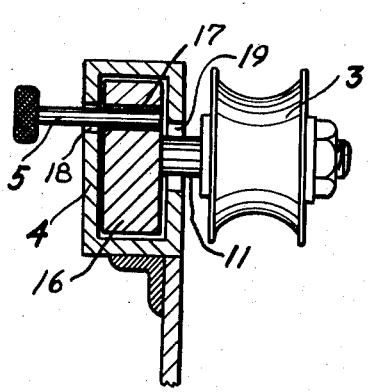
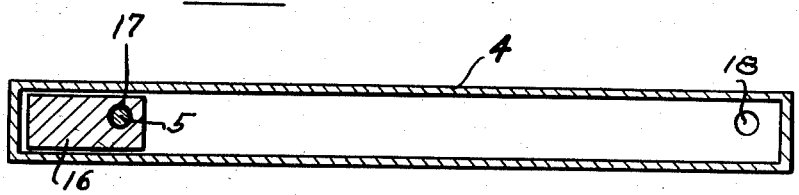

2,898,695

FISHING VESSEL

Hans Behring, Schonberg, near Kiel, Germany, assignor to Kieler Howaldtswerke A.G., Kiel-Dietrichsdorf, Germany, a firm Application December 4, 1956, Serial No. 626,104

2 Claims. (Cl. 43—8)

This invention relates to fishing vessels, and more specifically to an arrangement for hauling fishing nets onto such vessels.

It is customary on fishing vessels to fish with a net over one side of the vessel. Two fishing gallows are mounted at the side of the vessel and two drag lines of the fishing net are guided over these gallows onto a net winch arranged in the forecastle of the vessel. The fishing net must be pulled over the bulwark by the crew partly by hand, and for this purpose the deck and the bulwark are very low above the water on the known fishing vessels. The whole hauling-up operation is difficult in bad weather and frequently dangerous for the crew.

The object of the invention is to overcome these objections and to provide a fishing vessel with a slipway for the fishing net at the stern of the vessel, such as is known on whaling factory ships, so as to reduce considerably the straining and the wear of the expensive drag lines and to enable the crew to stand fully protected, which is not the case on ordinary fishing vessels.

According to the invention a vessel for fishing and equipped with at least one fishnet, drag lines and wings or wing-like segments on the net, comprises at least one slipway provided in the rear part of the vessel and extending along the longitudinal axis thereof. A quarter deck of the vessel is subdivided by said slipway into separate decks, and means are provided aboard the vessel for hauling the fishnet over said slipway onto the quarter deck. These means include a net winch with at least two drums arranged in front of the slipway and a single roller on each side of the slipway for guiding the drag lines of the fishnet without reversal or deflection and these rollers are shiftable in the longitudinal direction of the vessel.

According to a further feature of the invention, the rollers that are guided in the slideways can be fixed in their rearward positions. When hauling in the net the rollers remain in their rearward position until the wings of the net come into contact with the bulwark and are made secure and the first balls of the ground tackle are situated before the rollers. Then the rollers are released and move into their forward position in the slideways with the result that the drag lines then assume a position which corresponds substantially to the incline of the slipway.

In one embodiment of the invention the slideways for the rollers are arranged in substantially horizontal position on both sides of the slipway. It is, however, likewise possible to provide at the stern of the vessel on both sides of the slipway conventional gallows for use in hauling up the wings of the fishing net onto the deck. In this case the slideway for the rollers is given a position sloping downwards towards the stern.

Two preferred embodiments of the invention are illustrated by way of example in the accompanying drawing, in which:

Fig. 1 is a longitudinal section taken on line I—I of Fig. 2 through the stern portion of a fishing vessel including a slipway and having a substantially horizontal deck with slideways and a roller mounted for adjustment along the slideways, the roller of one slideway being shown in its rearmost position;

Fig. 2 is a top plan view of the stern portion of the vessel embodying the invention, showing a fragmentary portion of the net and wings thereof;

Fig. 3 is a view similar to Fig. 1 taken on line III—III of Fig. 4, showing another type vessel incorporating the invention, and showing the roller in the slideway in the foremost position;

Fig. 4 is a fragmentary top plan view of Fig. 3;

Fig. 5 is an enlarged section taken on line V—V of Fig. 2; and

Fig. 6 is an enlarged section, on a scale differing from Fig. 5, taken on line VI—VI of Fig. 2.

As shown in Figs. 1 and 2, the vessel for fishing is provided with a fishnet 15, drag lines 2 and wings 8 on the fishnet. The vessel also has a slipway 1 provided in the central rear part of the vessel and extending in the longitudinal direction thereof so that the quarter deck of the vessel is subdivided into two separate decks 6. On each side of the slipway 1, one of the drag lines 2 is guided over a roller 3 which is shiftable in a slideway 4 extending in the longitudinal extension of the vessel. The rollers 3 are fixable in their rearward position in the slideways 4 by means of bolts 5. The decks 6 extend on each side of the slipway 1.

When hauling in the net the drag lines 2, each of which is guided over only one of said rollers 3 without deflection or reversal, are pulled in by means of drums 7 of a known net winch (not shown) until the wings 8 of the fishnet strike against the rear bulwark 9 of the vessel. The wings 8 are then fixed to the bulwark 9 or hauled onto the deck 12 of the vessel or deposited on the decks 6, or secured to the gallows 13 since the line 14 connects the net to the drag line respectively. After doing so, the rollers 3 are released from their arresting bolts 5 and, as the net is heaved further in, move in the guideway 4 into the position indicated at 3' at the front end of the slideways 4' in Figs. 3 and 4. The drag lines 2 then assume a position shown in Figs. 3 and 4, and the net can be drawn over the slipway 1 onto the deck 12. Here the tail of the net is emptied either onto the deck 12 in known manner or through hatchways flush with the deck 12, onto a deck located thereunder. As seen in Figs. 5 and 6, the rollers 3 are mounted on a shaft 11 projecting laterally from a block 16 slidably supported in slideways 4. The bolts are extendable through longitudinally spaced apertures 18 and are detachably mounted in a transverse bore 17 in the block 16. The shaft 11 extends through a longitudinal slot 19 extending the length of the slideway 4.

In a modified form of construction shown in Figs. 3 and 4, gallows 13 are arranged on the quarter deck of the vessel on each side of the slipway for hauling up the wings 8 of the fishnet by means of hooks and ropes, not shown, running over a pulley block. In this form of construction the slideways 4 guiding the rollers 3 can be arranged sloping downwards towards the stern of the vessel. The release of the rollers 3, after the hauling in of the wings 8 onto the decks 6 and the subsequent hauling in of the net over the slipway 1 onto the deck 12, is effected in the manner already described.

The wings and all the fittings or tackle of the net can be constructed in the manner known in the high seas fishing industry and also as used when fishing over the side of a ship.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

I claim:

1. In a fishing vessel of the type described and provided with a slipway disposed at the stern of the vessel and extending in the longitudinal direction of the vessel, with said slipway being adapted to receive a fishnet having draglines and wing members affixed thereto, the combination of deck means disposed adjacent each side of the slipway, each of said deck means also being provided with a guideway extending longitudinally of said vessel, roller means for accommodating the draglines of the said fishnet, said roller means also being slidably disposed within at least one of the said guideways and means for removably locking said roller means in the guideways therefor and at a point adjacent the rearmost portion of said slipway, whereby when the draglines and wing members for the fishnet are drawn up onto the slipway through the medium of said roller means, said roller means may be unlocked from its rearmost position and shifted to the front end of the guideway therefor, to further assist in drawing the fishnet up the slipway and onto the vessel.

2. A vessel as set forth in claim 2 wherein gallows are arranged on the vessel and on each side of the slipway adjacent the stern of the vessel, said gallows being utilized to assist in the hauling up of the wing members of the fishnet during the operation of said roller means.

References Cited in the file of this patent

UNITED STATES PATENTS

| 778,818 | Yancey | Dec. 27, 1904 |
| 1,566,637 | Ward | Sept. 28, 1925 |
| 1,863,989 | Liisanantti | June 21, 1932 |
| 2,579,787 | Burney | Dec. 25, 1951 |

FOREIGN PATENTS

| 1,032,425 | France | July 1, 1953 |